United States Patent
Ohmori (10) Patent No.: US 6,671,096 B2
(45) Date of Patent: Dec. 30, 2003

(54) DIFFRACTIVE OPTICAL ELEMENT AND AN OPTICAL SYSTEM HAVING A DIFFRACTIVE OPTICAL ELEMENT

(75) Inventor: Shigeto Ohmori, Kawachinagano (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/076,249

(22) Filed: Feb. 13, 2002

(65) Prior Publication Data

US 2002/0167728 A1 Nov. 14, 2002

Related U.S. Application Data

(62) Division of application No. 09/271,553, filed on Mar. 18, 1999, now Pat. No. 6,392,805.

(30) Foreign Application Priority Data

Mar. 23, 1998 (JP) .......................... H10-073975
Mar. 23, 1998 (JP) .......................... H10-073980
Mar. 25, 1998 (JP) .......................... H10-077378

(51) Int. Cl.$^7$ ................................. G02B 5/18
(52) U.S. Cl. .................... 359/576; 359/569; 359/571; 359/573; 359/575
(58) Field of Search ........................ 359/565, 566, 359/569, 576, 573, 575; 351/161

(56) References Cited

U.S. PATENT DOCUMENTS

| | | | | |
|---|---|---|---|---|
| 4,634,219 A | * | 1/1987 | Suzuki ..................... 359/576 |
| 4,983,002 A | * | 1/1991 | Shikama et al. ............ 359/566 |
| 5,017,000 A | * | 5/1991 | Cohen ..................... 359/575 |
| 5,054,905 A | * | 10/1991 | Cohen ..................... 359/569 |
| 5,121,980 A | * | 6/1992 | Cohen ..................... 359/565 |
| 5,473,471 A | * | 12/1995 | Yamagata et al. .......... 359/569 |
| 5,847,877 A | | 12/1998 | Imamura et al. ............ 359/566 |
| 5,995,286 A | * | 11/1999 | Mukai et al. ............... 359/571 |
| 6,157,488 A | * | 12/2000 | Ishii ....................... 359/569 |
| 6,392,805 B1 | * | 5/2002 | Ohmori .................... 359/569 |

OTHER PUBLICATIONS

Steven M. Ebstein, "Nearly Index–Matched Optics for Aspherical, Diffractive, and Achromatic–Phase Diffractive Elements", *Optics Letters*, vol. 21, No. 18, Sep. 15, 1996.

* cited by examiner

*Primary Examiner*—Audrey Chang
(74) *Attorney, Agent, or Firm*—Sidley Austin Brown & Wood LLP (57) ABSTRACT

A diffractive optical element for white light is composed of a plurality of layers of optical materials and has a relief pattern constituting a diffraction grating formed at least at one cementing interface between the two different optical materials. The grating height of the relief pattern constituting the diffraction grating is defined by the following formula:

$$h = \lambda / |n - n'|$$

where h represents the grating height of the relief pattern constituting the diffraction grating; $\lambda$ represents the wavelength (here it is assumed that $\lambda \leq 450$ (nm)); n represents the refractive index of the optical material abutting the interface from the object side for light of the wavelength $\lambda$; and n' represents the refractive index of the optical material abutting the interface from the image side for light of the wavelength $\lambda$.

2 Claims, 4 Drawing Sheets

DIFFRACTIVE OPTICAL ELEMENT AND AN OPTICAL SYSTEM HAVING A DIFFRACTIVE OPTICAL ELEMENT

This application is a division of application Ser. No. 09/271,553, filed Mar. 18, 1999, now U.S. Pat. No. 6,392,805 B1, which issued on May 21, 2002 and which claimed priority from application Nos. H10-73975, H10-73980, and H10-77378 filed in Japan, the contents of which are hereby incorporated by reference.

BACKGROUND OF THE INVENTION

1. Field of the Invention

The present invention relates to a diffractive optical element and an optical system, and more particularly to a diffractive optical element for white light and an optical system including such a diffractive optical element.

2. Description of the Prior Art

A diffractive optical element has useful optical properties that are not found in a well-known refractive optical element. For example, a diffractive optical element having a light-condensing ability offers the following advantages. First, by providing a diffractive optical element on a lens surface of an ordinary refractive optical element, it is possible to give a single optical element both light-diffracting and light-refracting abilities. Second, a diffractive optical element makes effective correction of chromatic aberration possible because, in it, the quantity that corresponds to the dispersive power of a refractive optical element has the opposite sign.

Although a diffractive optical element has useful properties as described above, it also suffers from problems resulting from the fact that diffraction efficiency is wavelength-dependent. For example, except at the design wavelength, the diffracted light of orders other than the intended order is too intense. This causes ghosts, and thereby degrades imaging performance. In particular, an optical system designed for white light, i.e. one that needs to cope with a wide range of wavelengths, suffers greatly from this problem.

To solve this problem, U.S. Pat. No. 5,847,877 and a report written by Steven M. Ebstein (the Sep. 15, 1996 issue of Optical Society of America) each propose a diffractive optical element of the type that has a relief pattern constituting a diffraction grating formed at the cementing interface between two different optical materials. Here, by exploiting the fact that the difference in refractive index between two optical materials depends on the wavelength, the wavelength-dependent variation in phase difference is successfully prevented, and thereby higher diffraction efficiency is achieved over a wide wavelength range.

However, even though this diffractive optical element exhibits satisfactory diffraction efficiency for white light incident thereon, it does not automatically follow that it is fit for use in an optical system designed for white light. For such application, the diffractive optical element needs to exhibit satisfactory diffraction efficiency not only over a wide wavelength range extending from the g line to the C line, but also over its entire diameter, i.e. for axial as well as off-axial rays.

SUMMARY OF THE INVENTION

A first object of the present invention is to provide a diffractive optical element that exhibits satisfactory diffraction efficiency for white light.

A second object of the present invention is to provide an optical system that includes a diffractive optical element and that offers satisfactory diffraction efficiency not only over a wide wavelength range but also for axial as well as off-axial rays.

To achieve the above objects, according to one aspect of the present invention, a diffractive optical element for white light is composed of a plurality of layers of optical materials and has a relief pattern constituting a diffraction grating formed at least at one cementing interface between two different optical materials. The grating height (i.e. the trough-to-ridge height) of the relief pattern constituting the diffraction grating is defined by the following formula:

$$h = \lambda/|n-n'|$$

where h represents the grating height of the relief pattern constituting a diffraction grating;

$\lambda$ represents the wavelength (here it is assumed that $\lambda \leq 450$ (nm));

n represents the refractive index of the optical material abutting the interface from the object side for light of the wavelength $\lambda$; and n' represents the refractive index of the optical material abutting the interface from the image side for light of the wavelength $\lambda$.

According to another aspect of the present invention, an optical system is provided with a diffractive optical element composed of glass and resin cemented together and has a relief pattern constituting a diffraction grating formed at the cementing interface therebetween. The diffractive optical element is so designed that the relief pattern is placed on the object side of the pupil or the aperture stop of the optical system. If the diffraction grating has a positive optical power, the diffractive optical element is composed of, from the object side, the resin, the relief pattern, and the glass. If the diffraction grating has a negative optical power, the diffractive optical element is composed of, from the object side, the glass, the relief pattern, and the resin.

According to another aspect of the present invention, an optical system is provided with a diffractive optical element that is composed of glass and resin cemented together and has a relief pattern constituting a diffraction grating formed at the cementing interface therebetween. The diffractive optical element is so designed that the relief pattern is placed on the image side of the pupil or the aperture stop of the optical system. If the diffraction grating has a positive optical power, the diffractive optical element is composed of, from the object side, the glass, the relief pattern, and the resin. If the diffraction grating has a negative optical power, the diffractive optical element is composed of, from the object side, the resin, the relief pattern, and the glass.

According to another aspect of the present invention, a method for manufacturing an optical system comprises: a step of disposing a diffractive optical element that is composed of glass and resin cemented together and has a relief pattern constituting a diffraction grating formed at the cementing interface therebetween with the relief pattern placed on the object side of the pupil or the aperture stop of the optical system; and a step of, if the diffraction grating has a positive optical power, composing the diffractive optical element of, from the object side, the resin, the relief pattern, and the glass, and, if the diffraction grating has a negative optical power, composing the diffractive optical element of, from the object side, the glass, the relief pattern, and the resin.

According to another aspect of the present invention, a method for manufacturing an optical system comprises: a step of disposing a diffractive optical element that is composed of glass and resin cemented together and has a relief pattern constituting a diffraction grating formed at the cementing interface therebetween with the relief pattern placed on the image side of the pupil or the aperture stop of the optical system; and a step of, if the diffraction grating has a positive optical power, composing the diffractive optical element of, from the object side, the glass, the relief pattern, and the resin, and, if the diffraction grating has a negative optical power, composing the diffractive optical element of, from the object side, the resin, the relief pattern, and the glass.

According to another aspect of the present invention, a diffractive optical element is composed of a plurality of layers of optical materials and has a relief pattern constituting a diffraction grating formed at least at one cementing interface between two different optical materials. The optical material abutting the relief pattern from one side is glass that fulfills Conditions (A1), (B1), and (C1) below. The optical material abutting the relief pattern from the other side is resin that fulfills Conditions (A2) and (B2) below:

$$nd \leq 1.62 \quad (A1)$$

$$nd \leq 1.6 \quad (A2)$$

$$55 \leq vd \quad (B1)$$

$$30 \leq vd \leq 60 \quad (B2)$$

$$Tg < 600 \quad (C1)$$

where
  vd represents the Abbe number (which equals (nd−1)/(nF−nC));
  nd represents the refractive index of the optical material, for the d line;
  nF represents the refractive index of the optical material, for the F line;
  nC represents the refractive index of the optical material, for the C line; and
  Tg represents the transition point of the glass (° C.).

According to another aspect of the present invention, a diffractive optical element is composed of a plurality of layers of optical materials and has a relief pattern constituting a diffraction grating formed at least at one cementing interface between two different optical materials. The optical material abutting the relief pattern from one side is glass that fulfills Conditions (A3), (B3), and (C1) below. The optical material abutting the relief pattern from the other side is resin that fulfills Conditions (A4) and (B4) below:

$$1.6 \leq nd \quad (A3)$$

$$nd \leq 1.65 \quad (A4)$$

$$vd \leq 40 \quad (B3)$$

$$vd \leq 30 \quad (B4)$$

$$Tg < 600 \quad (C1)$$

where
  vd represents the Abbe number (which equals (nd−1)/(nF−nC));
  nd represents the refractive index of the optical material, for the d line;
  nF represents the refractive index of the optical material, for the F line;
  nC represents the refractive index of the optical material, for the C line; and
  Tg represents the transition point of the glass (° C.).

According to another aspect of the present invention, a diffractive optical element is composed of a plurality of layers of optical materials and has a relief pattern constituting a diffraction grating formed at least at one cementing interface between two different optical materials. The optical material abutting the relief pattern from one side is glass that fulfills Conditions (A5), (B5), and (C1) below, and the optical material abutting the relief pattern from the other side is resin that fulfills Conditions (A4) and (B4) below:

$$nd \leq 1.65 \quad (A4)$$

$$1.65 \leq nd \quad (A5)$$

$$vd \leq 30 \quad (B4)$$

$$40 \leq vd \leq 55 \quad (B5)$$

$$Tg < 600 \quad (C1)$$

where
  vd represents the Abbe number (which equals (nd−1)/(nF−nC));
  nd represents the refractive index of the optical material, for the d line;
  nF represents the refractive index of the optical material, for the F line;
  nC represents the refractive index of the optical material, for the C line; and
  Tg represents the transition point of the glass (° C.).

According to another aspect of the present invention, in a method for manufacturing a diffractive optical element that is composed of a plurality of layers of optical materials and has a relief pattern constituting a diffraction grating formed at least at one cementing interface between two different optical materials, the optical material abutting the relief pattern from one side is glass that fulfills Conditions (A1), (B1), and (C1) below, and the optical material abutting the relief pattern from the other side is resin that fulfills Conditions (A2) and (B2) below:

$$nd \leq 1.62 \quad (A1)$$

$$nd \leq 1.6 \quad (A2)$$

$$55 \leq vd \quad (B1)$$

$$30 \leq vd \leq 60 \quad (B2)$$

$$Tg < 600 \quad (C1)$$

where
  vd represents the Abbe number (which equals (nd−1)/(nF−nC));
  nd represents the refractive index of the optical material, for the d line;
  nF represents the refractive index of the optical material, for the F line;
  nC represents the refractive index of the optical material, for the C line; and
  Tg represents the transition point of the glass (° C.).

According to another aspect of the present invention, in a method for manufacturing a diffractive optical element that is composed of a plurality of layers of optical materials and has a relief pattern constituting a diffraction grating formed at least at one cementing interface between two different optical materials, the optical material abutting the relief pattern from one side is glass that fulfills Conditions (A3), (B3), and (C1) below, and the optical material abutting the relief pattern from the other side is resin that fulfills Conditions (A4) and (B4) below:

$$1.6 \leq nd \quad (A3)$$

$$nd \leq 1.65 \quad (A4)$$

$$vd \leq 40 \quad (B3)$$

$$vd \leq 30 \quad (B4)$$

$$Tg < 600 \quad (C1)$$

where vd represents the Abbe number (which equals $(nd-1)/(nF-nC)$);

nd represents the refractive index of the optical material, for the d line;

nF represents the refractive index of the optical material, for the F line;

nC represents the refractive index of the optical material, for the C line; and

Tg represents the transition point of the glass (° C.).

According to another aspect of the present invention, in a method for manufacturing a diffractive optical element that is composed of a plurality of layers of optical materials and has a relief pattern constituting a diffraction grating formed at least at one cementing interface between two different optical materials, the optical material abutting the relief pattern from one side is glass that fulfills Conditions (A5), (B5), and (C1) below, and the optical material abutting the relief pattern from the other side is resin that fulfills Conditions (A4) and (B4) below:

$$nd \leq 1.65 \quad (A4)$$

$$1.65 \leq nd \quad (A5)$$

$$vd \leq 30 \quad (B4)$$

$$40 \leq vd \leq 55 \quad (B5)$$

$$Tg < 600 \quad (C1)$$

where vd represents the Abbe number (which equals $(nd-1)/(nF-nC)$);

nd represents the refractive index of the optical material, for the d line;

nF represents the refractive index of the optical material, for the F line;

nC represents the refractive index of the optical material, for the C line; and

Tg represents the transition point of the glass (° C.).

According to another aspect of the present invention, an optical system includes a diffractive optical element that is composed of a plurality of layers of optical materials and has a relief pattern constituting a diffraction grating formed at least at one cementing interface between two different optical materials. The diffractive optical element acts as a lens element that makes a light beam converge or diverge. The relief pattern is located relatively far away from the pupil or the aperture stop of the optical system. The relief pattern is so shaped that the diffraction grating has a blaze-formed or trapezoid sectional profile in the central region with respect to the optical axis and has a triangular sectional profile in the peripheral region with respect to the optical axis.

According to another aspect of the present invention, an optical system includes a diffractive optical element that is composed of a plurality of layers of optical materials and has a relief pattern constituting a diffraction grating formed at least at one cementing interface between two different optical materials. If the angle of incidence of the light rays incident on the interface distributes substantially evenly toward the positive and negative sides relative to 0°, the relief pattern is so shaped that the diffraction grating has a blaze-formed or trapezoid sectional profile. If the angle of incidence of the light rays incident on the interface distributes unevenly toward either the positive or the negative side relative to 0°, the relief pattern is so shaped that the diffraction grating has a triangular sectional profile.

According to another aspect of the present invention, in a method for manufacturing an optical system including a diffractive optical element that is composed of a plurality of layers of optical materials and has a relief pattern constituting a diffraction grating formed at least at one cementing interface between two different optical materials, the diffractive optical element acts as a lens element that makes a light beam converge or diverge. The relief pattern is located relatively far away from the pupil or the aperture stop of the optical system. The relief pattern is so shaped that the diffraction grating has a blaze-formed or trapezoid sectional profile in the central region with respect to the optical axis and has a triangular sectional profile in the peripheral region with respect to the optical axis.

According to still another aspect of the present invention, in a method for manufacturing an optical system including a diffractive optical element that is composed of a plurality of layers of optical materials and has a relief pattern constituting a diffraction grating formed at least at one cementing interface between two different optical materials, if the angle of incidence of the light rays incident on the interface distributes substantially evenly toward the positive and negative sides relative to 0°, the relief pattern is so shaped that the diffraction grating has a blaze-formed or trapezoid sectional profile. If the angle of incidence of the light rays incident on the interface distributes unevenly toward either the positive or negative side relative to 0°, the relief pattern is so shaped that the diffraction grating has a triangular sectional profile.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1A:
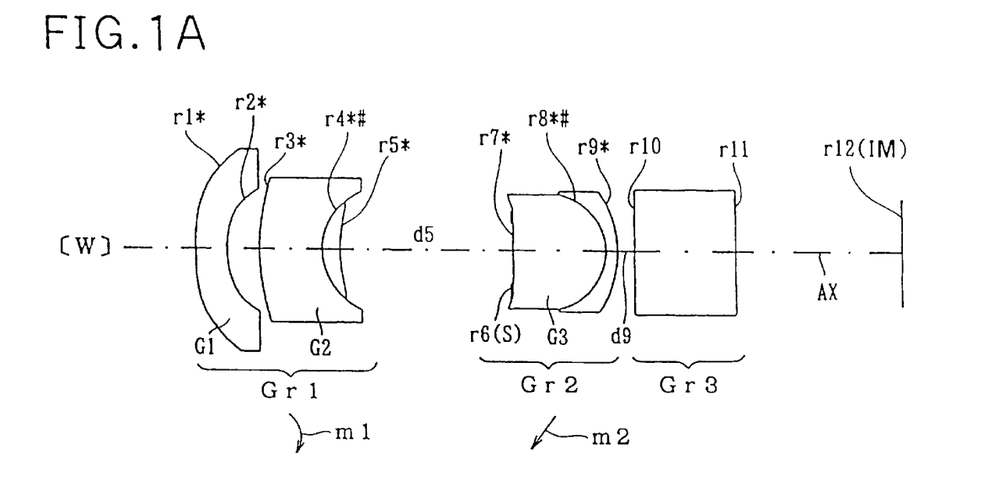
FIGS. 1A to 1C are diagrams showing the lens arrangement of a zoom lens system embodying the present invention, as observed in the wide-angle end, middle-focal-length, and telephoto-end condition, respectively.
Figure 1B:
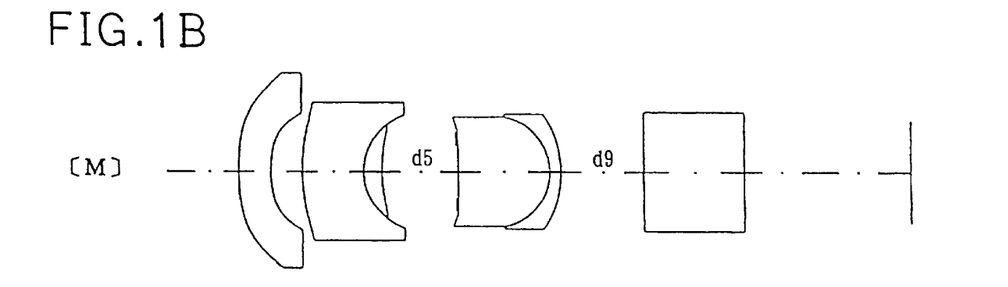
Figure 1C:
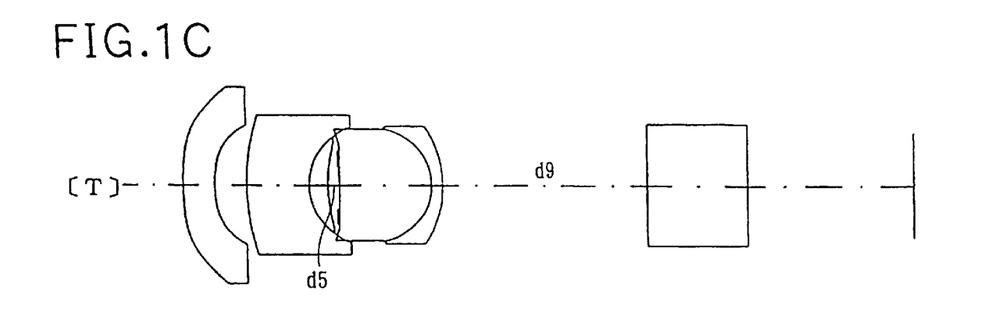

Hereinafter, a diffractive optical element embodying the present invention and an optical system including such a diffractive optical element will be described with reference to the drawings. FIGS. 1A to 1C show the lens arrangement of a zoom lens system embodying the invention, with FIG. 1A showing the lens arrangement observed in the wide-angle-end condition [W], FIG. 1B showing the lens arrangement observed in the middle-focal-length condition [M], and FIG. 1C showing the lens arrangement observed in the telephoto-end condition [T]. In FIG. 1A, arrows m1 and m2 schematically indicate the movement of a first lens unit (Gr1) and a second lens unit (Gr2) during zooming. In FIGS. 1A to 1C, di (i=5 or 9) indicates the variable axial distances that vary with zooming. In FIGS. 1A to 1C, ri (i=1, 2, 3, . . . ) represents the ith surface counted from the object side (note that the surface r12 is the image plane (IM)), a surface ri marked with an asterisk (*) is an aspherical surface, and a surface ri marked with # is a diffractive optical surface (i.e. a surface having a diffraction rating).

This zoom lens system is composed of a first lens unit (Gr1) having a first and a second lens element (G1 and G2), a second lens unit (Gr2) having an aperture stop (S) and a third lens element (G3), and a third lens unit (Gr3) having a low-pass filter. The second and third lens elements (G2 and G3) are each a diffractive optical element composed of two layers of different optical materials cemented together with a relief pattern constituting a diffraction grating formed at the cementing interface (r4 or r8) therebetween. At the interface (r4) in the second lens element (G2) is formed a diffractive optical surface having a negative-powered diffraction grating. At the interface (r8) in the third lens element (G3) is formed a diffractive optical surface having a positive-powered diffraction grating. The medium that exists on the object side of each of the interfaces (r4) and (r8) is glass, and the medium that exists on the image side thereof is resin.

The interfaces (r4) and (r8) at which the relief patterns are formed are located relatively far away from the aperture stop (S). Moreover, as will be understood from the enlarged partial sections shown in FIGS. 2 and 3, the relief patterns are each designed to constitute a diffraction grating that has different sectional profiles in its central and peripheral regions. More precisely, the relief patterns are each designed to constitute a diffraction grating that has a blaze-formed sectional profile in its central region with respect to the optical axis (AX) and has a triangular sectional profile in its peripheral region with respect to the optical axis (AX).

Figure 2:
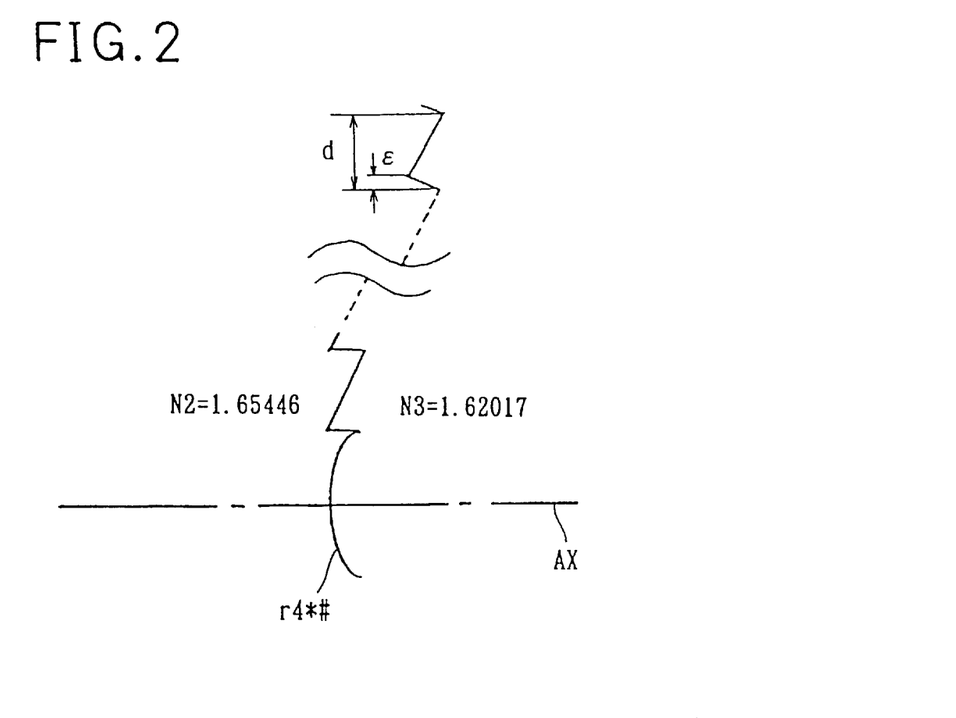
FIG. 2 is an enlarged partial section of the diffractive optical surface provided on the second lens element.
Figure 3:
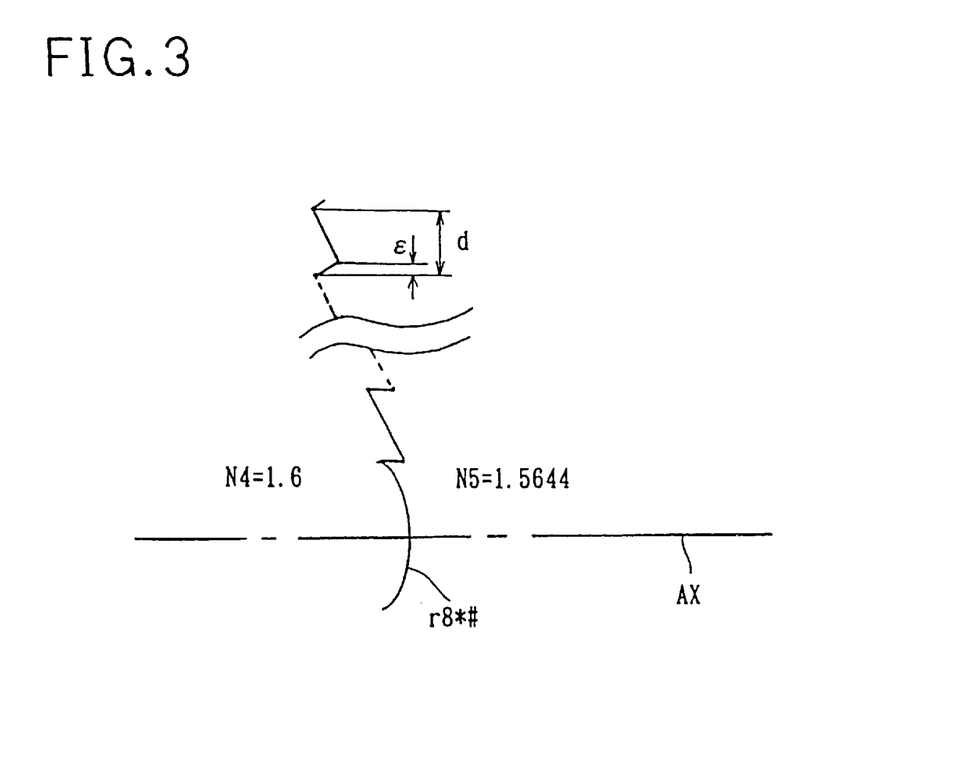
FIG. 3 is an enlarged partial section of the diffractive optical surface provided on the third lens element.

As described above, the diffractive optical surfaces used in this embodiment have a diffraction grating that has different sectional profiles in different regions thereof. Usually, a relief pattern is designed to constitute a diffraction grating that has one of the following three types of sectional profile: a blaze-formed sectional profile, a triangular sectional profile, and a trapezoid sectional profile. Different types of sectional profile offer different diffraction efficiency. Hereafter, the diffraction efficiency obtained with each type of sectional profile will be described.

Figure 4:
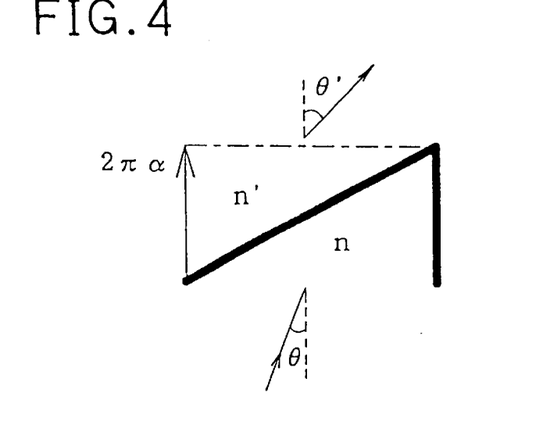
FIG. 4 is a sectional view of a relief pattern that gives the diffraction grating a blaze-formed sectional profile.

If a relief pattern is designed to constitute a diffraction grating that has a blaze-formed sectional profile as shown in FIG. 4, the diffraction efficiency η is defined by Formula (I) below.

$$\eta = [\{\sin(\pi(\alpha-m))\}/\{\pi(\alpha-m)\}]^2 \quad (I)$$

where m represents the order of diffraction, $$\alpha = h0(n \cdot \cos\theta - n' \cdot \cos\theta')/\lambda \quad (I')$$

λ represents the wavelength;

n represents the refractive index of the optical material abutting the interface from the object side, for light of the wavelength λ;

n' represents the refractive index of the optical material abutting the interface from the image side, for light of the wavelength λ;

θ represents the angle of incidence of the light rays incident on the interface (in degrees);

θ' represents the angle of emergence of the light rays emerging from the interface (in degrees);

h0 represents the grating height (=λ0/(n0−n'0));

λ0 represents the design wavelength;

n0 represents the refractive index of the optical material abutting the interface from the object side, for light of the wavelength λ; and n'0 represents the refractive index of the optical material abutting the interface from the image side, for light of the wavelength λ.

Figure 5:
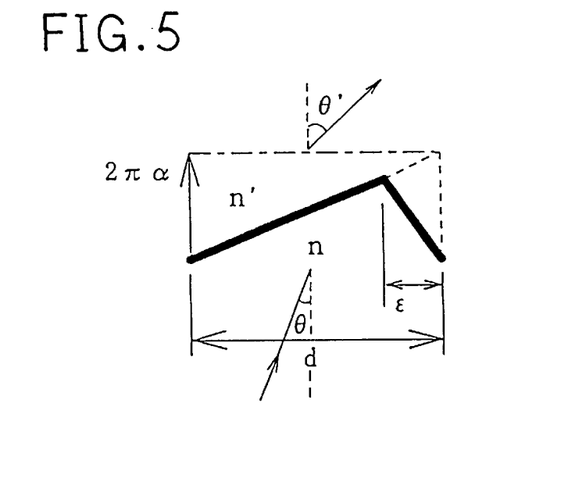
FIG. 5 is a sectional view of a relief pattern that gives the diffraction grating a triangular sectional profile.

If a relief pattern is designed to constitute a diffraction grating that has a triangular sectional profile as shown in FIG. 5, the diffraction efficiency η (assuming that α=m=1) is defined by Formula (II) below. Note that, in the data listed later, calculations are made with arbitrary values in α and m.

$$\eta = (1-\epsilon/d)^2 \quad (II)$$

where d represents the grating pitch; and

ε represents the position of the vertex of the triangle as measured in the direction of the grating pitch.

Figure 6:
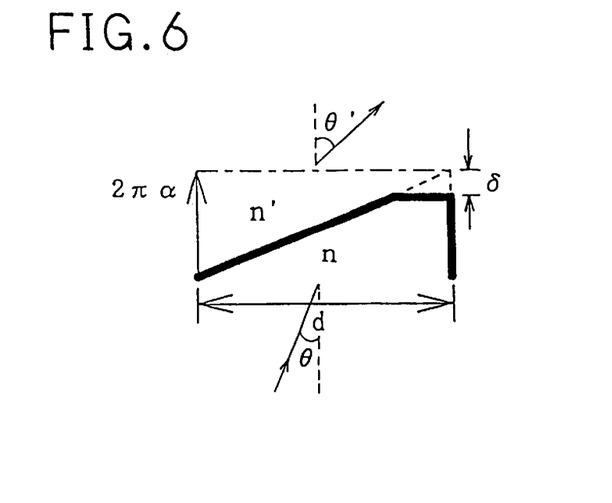
FIG. 6 is a sectional view of a relief pattern that gives the diffraction grating a trapezoid sectional profile.

If a relief pattern is designed to constitute a diffraction grating that has a trapezoid sectional profile as shown in FIG. 6, the diffraction efficiency η (assuming that α=m=1) is defined by Formula (III) below. Note that, in the data listed later, calculations are made with arbitrary values in α and m.

$$\eta = \{1-\delta/2\pi + \sin(\delta/2\pi)\}^2 + (\sin\delta)^4/\pi^2 \quad (III)$$

where

δ represents the position of the plane perpendicular to the optical axis (AX) in the direction along the optical axis (AX);

As will be understood from Formula (I'), in an optical system including a diffractive optical element, the diffraction efficiency η varies according to the angle θ at which light rays strike the interface at which a relief pattern constituting a diffraction grating is formed. Here, the characteristics of the optical system of the embodiment will be described based upon the diffraction efficiency η calculated for the case where θ=0° and for the case where θ=20°.

Table 1 lists the diffraction efficiency η calculated for the case where θ=0°, and Table 2 lists the diffraction efficiency η calculated for the case where θ=20°. Light rays incident at θ=0° are considered to be representative of light rays in cases where only axial rays are considered or where the angle of incidence of the light rays incident on the interface distributes substantially evenly toward the positive and negative sides relative to 0°. Light rays incident at θ=20° are considered to be representative of light rays in cases where only off-axial rays are considered or where the angle of incidence of the light rays incident on the interface distributes unevenly toward either the positive or negative side.

In calculating the diffraction efficiency η, the optical material abutting the interface from the object side is assumed to be resin MS300 (with a refractive index nd=1.5644 for the d line and an Abbe number νd=35.1). On the other hand, the optical material abutting the interface from the image side is assumed to be glass PSKS52 (with a refractive index nd=1.6 for the d line, an Abbe number νd=64.33, and a transition point=534° C.). The grating height (h0) of the diffraction grating is assumed to be 16.6 μm (the design wavelength λ0: the g line), and the optical power of the diffraction grating is assumed to be 0.008557. Moreover, it is assumed that when light rays enter the diffractive optical surface at an angle of θ=0°, the light resulting from first-order diffraction exits from the diffractive optical surface at an angle of θ'=−0.78°, and that, when light rays enter the diffractive optical surface at an angle of θ=−20°, the light resulting from the first-order diffraction exits from the diffractive optical surface at an angle of θ'=−20.38°.

As will be understood from Table 1, a relief pattern designed to constitute a diffraction grating having a blaze-formed or trapezoid sectional profile exhibits high diffraction efficiency for diffraction of order 1 and low diffraction efficiency for diffraction of orders 0 and 2 (see the underlined values in Table 1). Accordingly, here the angle of incidence θ=0°, it is preferable to use a relief pattern designed to constitute a diffraction grating having a blaze-formed or trapezoid sectional profile.

In other words, in an optical system including an diffractive optical element composed of a plurality of layers of optical materials and having a relief pattern constituting a diffraction grating formed at least at one cementing interface between two different optical materials, wherein the diffractive optical element acts to make a light beam converge or diverge, and wherein the relief pattern is located relatively far away from the pupil or the aperture stop of the optical system, by designing the relief pattern to constitute a diffraction grating having a blaze-formed or trapezoid sectional profile in its central region with respect to the optical axis, it is possible to realize an optical system including a diffractive optical element that offers satisfactory diffraction efficiency. By contrast, if the relief pattern is designed to constitute a diffraction grating having a triangular sectional profile, it will exhibit high diffraction efficiency for diffraction of order 2 for the F line (λ=486.13 nm), and thus offers poorer overall diffraction performance, as compared with the case where it is given a blaze-formed or trapezoid sectional profile.

Similarly, in an optical system including an diffractive optical element composed of a plurality of layers of optical materials and having a relief pattern constituting a diffraction grating formed at least at one cementing interface between two different optical materials, if the angle of incidence of the light rays incident on the interface distributes substantially evenly toward the positive and negative sides relative to 0°, by designing the relief pattern to constitute a diffraction grating having a blaze-formed or trapezoid sectional profile, it is possible to realize an optical system including a diffractive optical element that offers satisfactory diffraction efficiency. By contrast, if the relief pattern is designed to constitute a diffraction grating having a triangular sectional profile, it will exhibit high diffraction efficiency for diffraction of order 2 for the F line (λ=486.13 nm), and thus offers poorer overall diffraction performance, as compared with the case where it is given a blaze-formed or trapezoid sectional profile.

As will be understood from Table 2, a relief pattern designed to constitute a diffraction grating having a triangular sectional profile exhibits low diffraction efficiency for diffraction of order 2 (see the underlined values in Table 2). Accordingly, where the angle of incidence θ=20°, it is preferable to use a relief pattern designed to constitute a diffraction grating having a triangular sectional profile.

In other words, in an optical system including an diffractive optical element composed of a plurality of layers of optical materials and having a relief pattern constituting a diffraction grating formed at least at one cementing interface between two different optical materials, wherein the diffractive optical element acts to make a light beam converge or diverge, and wherein the relief pattern is located relatively far away from the pupil or the aperture stop of the optical system, by designing the relief pattern to constitute a diffraction grating having a triangular sectional profile in its peripheral region with respect to the optical axis, it is possible to realize an optical system including a diffractive optical element that offers satisfactory diffraction efficiency. This is because, if the relief pattern is located relatively far away from the pupil or the aperture stop of the optical system, off-axial rays enter the peripheral region with respect to the optical axis. By contrast, if the relief pattern is designed to constitute a diffraction grating having a blaze-formed or trapezoid sectional profile, it will exhibit high diffraction efficiency for diffraction of order 2 for the F line (λ=486.13 nm), and thus offers poorer overall diffraction performance, as compared with the case where it is given a triangular sectional profile.

Similarly, in an optical system including an diffractive optical element composed of a plurality of layers of optical materials and having a relief pattern constituting a diffraction grating formed at least at one cementing interface between two different optical materials, if the angle of incidence of the light rays incident on the interface distributes unevenly toward either the positive or negative side relative to 0°, by designing the relief pattern to constitute a diffraction grating having a triangular sectional profile, it is possible to realize an optical system including a diffractive optical element that offers satisfactory diffraction efficiency. By contrast, if the relief pattern is designed to constitute a diffraction grating having a blaze-formed or trapezoid sectional profile, it will exhibit high diffraction efficiency for diffraction of order 2 for the F line (λ=486.13 nm), and thus offers poorer overall diffraction performance, as compared with the case where it is given a triangular sectional profile.

As described above, in a case where a relief pattern is designed to constitute a diffraction grating having a triangular sectional profile, it is preferable to use a triangular sectional profile that is defined by Formula (IV) below. If this formula is satisfied, it is possible to decrease the diffraction efficiency for diffraction of orders 0 and 2 for the C line (λ=656.28 nm), and thereby enhance diffraction performance. If Formula (IV) is not satisfied, the diffraction efficiency for diffraction of orders 0 and 2 for the C line (λ=656.28 nm) becomes unduly high and thus degrades imaging performance.

$$\epsilon/d = k \cdot |\theta| \qquad (IV)$$

where k represents a constant in the range from 0.0025 through 0.0075.

Next, an embodiment of the invention will be described that exhibits satisfactory diffraction efficiency over a wide wavelength range and for axial as well as off-axial rays regardless of the sectional profile of its diffraction grating. As will be understood from the structure of the second and third lens elements (G2 and G3) described previously, in this embodiment, the diffractive optical elements are each composed of glass and resin cemented together with a relief pattern constituting a diffraction grating formed at the cementing interface therebetween. Here, the combination of glass PSKS52 and resin MS300 and the combination of glass SF9 and resin OPET are considered as examples. For each of these combinations, Table 3 lists the values of $\lambda/|n-n'|$, which correspond to the grating height at the wavelength λ, as calculated for the g, F, and C lines. Table 4 lists the refractive index nd for the d line, the Abbe number vd, and the transition point Tg of each of the above-mentioned types of glass and resin.

As will be understood from Table 3, the value of $\lambda/|n-n'|$ takes a medium value around the wavelength of the g line, a minimum value around the wavelength of the F line, and a maximum value around the wavelength of the C line. Accordingly, if the grating height h0 of the diffraction grating is determined with the design wavelength λ0 set around that of the g line, then the grating heights for the F and C lines will be equally deviated from the grating height for the g line, and as a result, it will be possible to obtain satisfactory diffraction efficiency over the wavelength range from the wavelength of the g line (435.84 nm) to the wavelength of the C-line (656.28 nm).

That is, in a diffractive optical element designed for white light and composed of a plurality of layers of optical materials with a relief pattern constituting a diffraction grating formed at least at one cementing interface between two different optical materials, if the grating height of the relief pattern is defined by Formula (V) below, it is possible to realize a diffractive optical element that offers satisfactory diffraction efficiency for white light (that is, over the wavelength range from the g-line wavelength (435.84 nm) to the C-line wavelength (656.28 nm)). If Formula (V) is not satisfied, it is not possible to obtain satisfactory diffraction efficiency around the wavelengths of the F and C lines.

$$h = \lambda/|n-n'| \qquad (V)$$

where h represents the grating height of the relief pattern constituting a diffraction grating;

λ represents the wavelength (here it is assumed that $\lambda \leq 450$ (nm));

n represents the refractive index of the optical material abutting the interface from the object side for light of the wavelength λ; and n' represents the refractive index of the optical material abutting the interface from the image side for light of the wavelength λ.

As will be understood from Formula (I') noted earlier, in an optical system including a diffractive optical element, the diffraction efficiency η varies according to the angle θ at which light rays strike the interface at which a relief pattern constituting a diffraction grating is formed. Here, the characteristics of the optical system of the embodiment will be described based upon the diffraction efficiency η calculated for axial as well as off-axial rays. Note that, in calculating the diffraction efficiency η, it is assumed that glass PSKS52 and resin MS300 are used, with both formed into a flat plate (so as to have no optical power due to refraction), and that the grating height h0 of the diffraction grating 16.6 (μm), and the design wavelength λ0=435 (nm).

Table 5 lists the diffraction efficiency η calculated for axial rays. Here, parallel rays incident at an angle of incidence of θ=0° are considered to be representative of axial rays. In this case, since cos (±θ') equals cos θ', the diffraction efficiency η remains equal regardless of whether the optical power of the diffraction grating bears a positive or negative sign. The optical power of the diffraction grating is assumed to be 0.008557, the angle of incidence with respect to the flat plates is assumed to be 0°, and the angle at which diffracted light of order 1 exits from the flat plates is assumed to be −0.78°.

As will be understood by comparing the two types of arrangement shown in Table 5, satisfactory diffraction efficiency can be achieved both in a diffractive optical element that has, from the object side, glass, a relief pattern, and resin and in a diffractive optical element that has, from the object side, resin, a relief pattern, and glass.

Next, the diffraction efficiency η for off-axial rays will be considered as observed in an arrangement as described above that offers satisfactory diffraction efficiency η for parallel incident light. The diffraction efficiency η for the off-axial rays needs to be considered separately depending on whether the relief pattern constituting the diffraction grating is located on the object side (front side) or on the image side (rear side) of the pupil (or the aperture stop) of the optical system, and also separately depending on whether the diffraction grating has a positive or negative optical power.

Table 6 lists the diffraction efficiency η (in percentages %) obtained in a case where the relief pattern is located on the front side of the pupil and the diffraction grating has a positive optical power. Here, the optical power of the diffraction grating is assumed to be 0.008557, the angle of incidence with respect to the flat plates is assumed to be −10°, and the angle at which diffracted light of order 1 exits from the flat plates is assumed to be −11.25°.

As will be understood by comparing the two types of arrangement shown in Table 6, if the diffractive optical element is composed of, from the object side, glass, a relief pattern, and resin, the diffraction efficiency for diffracted light of order 1 for the F line is unduly low, and the diffraction efficiency for diffracted light of order 2 for the F line is unduly high. Accordingly, in a case where the relief pattern is located on the front side of the pupil and the diffraction grating has a positive optical power, it is preferable that the diffractive optical element be composed of, from the object side, resin, a relief pattern, and glass.

The reason why the diffraction efficiency η varies according to the order in which the constituent elements of a diffractive optical element are arranged is as follows. According to Formula (VI) below, which describes refraction and diffraction, the angle of incidence θ and the angle of emergence θ' with respect to the interface (diffractive optical surface) vary according to the refractive indices n and n'. Consequently, the value α defined by Formula (I') also varies. The larger the angle of incidence θ (i.e. the more obliquely the light rays enter the interface) and the stronger the optical power of the diffraction grating (i.e. the smaller the diffraction pitch d and the higher the order), the larger the variation of the value α. Table 7 lists the values of α, η and other parameters obtained at the angle of incidence θ and the angle of emergence θ' (for m=2) for the F-line (λ=486.13 nm). From Table 7, it will be understood that the value α and the diffraction efficiency η vary according to the order in which the constituent elements of the diffractive optical element are arranged.

$$n'\cdot\sin\theta'-n\cdot\sin\theta=m\lambda/d \quad (VI)$$

where
   d represents the grating pitch.

As will be understood from the foregoing, in an optical system including a diffractive optical element composed of glass and resin cemented together and having a relief pattern constituting a diffraction grating formed at the cementing interface therebetween, wherein the relief pattern is placed on the object side of the pupil or the aperture stop of the optical system, if the diffraction grating has a positive optical power, by composing the diffractive optical element of, from the object side, the resin, the relief pattern, and the glass, it is possible to realize an optical system including a diffractive optical element that offers satisfactory diffraction efficiency for axial as well as off-axial rays. If this requirement is not satisfied for off-axial rays, the diffraction efficiency becomes too low for diffracted light of order 1 and too high for diffracted light of order 2.

Table 8 lists the diffraction efficiency η (in percentages %) obtained in a case where the relief pattern is located on the front side of the pupil and the diffraction grating has a negative optical power. Here, the optical power of the diffraction grating is assumed to be −0.008557, the angle of incidence with respect to the flat plates is assumed to be −10°, and the angle at which diffracted light of order 1 exits from the flat plates is assumed to be −8.750.

As will be understood by comparing the two types of arrangement shown in Table 8, if the diffractive optical element is composed of, from the object side, resin, a relief pattern, and glass, the diffraction efficiency for diffracted light of order 1 for the F line is unduly low, and the diffraction efficiency for diffracted light of order 2 for the F line is unduly high. Accordingly, in a case where the relief pattern is located on the front side of the pupil and the diffraction grating has a negative optical power, it is preferable that the diffractive optical element be composed of, from the object side, glass, a relief pattern, and resin.

As will be understood from the foregoing, in an optical system including a diffractive optical element composed of glass and resin cemented together and having a relief pattern constituting a diffraction grating formed at the cementing interface therebetween, wherein the relief pattern is placed on the object side of the pupil or the aperture stop of the optical system, if the diffraction grating has a negative optical power, by composing the diffractive optical element of, from the object side, the glass, the relief pattern, and the resin, it is possible to realize an optical system including a diffractive optical element that offers satisfactory diffraction efficiency for axial as well as off-axial rays. If this requirement is not satisfied for off-axial rays, the diffraction efficiency becomes too low for diffracted light of order 1 and too high for diffracted light of order 2.

Table 9 lists the diffraction efficiency η (in percentages %) obtained in a case where the relief pattern is located on the back side of the pupil and the diffraction grating has a positive optical power. Here, the optical power of the diffraction grating is assumed to be 0.008557, the angle of incidence with respect to the flat plates is assumed to be −10°, and the angle at which diffracted light of order 1 exits from the flat plates is assumed to be −8.75°.

As will be understood by comparing the two types of arrangement shown in Table 9, if the diffractive optical element is composed of, from the object side, resin, a relief pattern, and glass, the diffraction efficiency for diffracted light of order 1 for the F line is unduly low, and the diffraction efficiency for diffracted light of order 2 for the F line is unduly high. Accordingly, in a case where the relief pattern is located on the back side of the pupil and the diffraction grating has a positive optical power, it is preferable that the diffractive optical element be composed of, from the object side, glass, a relief pattern, and resin.

As will be understood from the foregoing, in an optical system including a diffractive optical element composed of glass and resin cemented together and having a relief pattern constituting a diffraction grating formed at the cementing interface therebetween, wherein the relief pattern is placed on the image side of the pupil or the aperture stop of the optical system, if the diffraction grating has a positive optical power, by composing the diffractive optical element of, from the object side, the glass, the relief pattern, and the resin, it is possible to realize an optical system including a diffractive optical element that offers satisfactory diffraction efficiency for axial as well as off-axial rays. If this requirement is not satisfied for off-axial rays, the diffraction efficiency becomes too low for diffracted light of order 1 and too high for diffracted light of order 2.

Table 10 lists the diffraction efficiency η (in percentages %) obtained in a case here the relief pattern is located on the back side of the pupil and the diffraction grating has a negative optical power. Here, the optical power of the diffraction grating is assumed to be −0.008557, the angle of incidence with respect to the flat plates is assumed to be −10°, and the angle at which diffracted light of order 1 exits from the flat plates is assumed to be −11.25°.

As will be understood by comparing the two types of arrangement shown in Table 10, if the diffractive optical element is composed of, from the object side, glass, a relief pattern, and resin, the diffraction efficiency for diffracted light of order 1 for the F line is unduly low, and the diffraction efficiency for diffracted light of order 2 for the F line is unduly high. Accordingly, in a case where the relief pattern is located on the back side of the pupil and the diffraction grating has a negative optical power, it is preferable that the diffractive optical element be composed of, from the object side, resin, a relief pattern, and glass.

As will be understood from the foregoing, in an optical system including a diffractive optical element composed of glass and resin cemented together and having a relief pattern constituting a diffraction grating formed at the cementing interface therebetween, wherein the relief pattern is placed on the image side of the pupil or the aperture stop of the optical system, if the diffraction grating has a negative optical power, by composing the diffractive optical element of, from the object side, the resin, the relief pattern, and the glass, it is possible to realize an optical system including a diffractive optical element that offers satisfactory diffraction efficiency for axial as well as off-axial rays. If this requirement is not satisfied for off-axial rays, the diffraction efficiency becomes too low for diffracted light of order 1 and too high for diffracted light of order 2.

The structure of the zoom lens system illustrated in the lens arrangement diagrams (FIGS. 1A to 1C) is presented in more detail in Table 11, which lists its construction data. In the construction data, ri (i=1, 2, 3, . . . ) represents the radius of curvature of the ith surface counted from the object side, di (i=1, 2, 3, . . . ) represents the ith axial distance counted from the object side, and Ni (i=1, 2, 3, . . . ) and vi (i=1, 2, 3, . . . ) respectively represent the refractive index for the d line and the Abbe number of the ith optical element counted from the object side. Moreover, in the construction data, for each of the axial distances that vary with zooming (i.e. the variable axial distances), two values are given that are, from left, the axial aerial distance between the lens units at the wide-angle end [W] (i.e. in the shortest-focal-length condition), and the same distance at the telephoto end [T] (i.e. in the longest-focal-length condition). Also listed are the focal length f, the half angle of view ω, and the F-number of the entire zoom lens system in the two focal-length conditions mentioned just above.

A surface whose radius of curvature ri is marked with an asterisk (*) is an aspherical surface, whose surface shape is defined by Formula (AS) below. A surface whose radius of curvature ri is marked with # is a surface formed as a diffractive optical surface, of which the phase shape of the pitch is defined by Formula (DS1) below. Furthermore, the position ε of the vertex of the triangle is defined by Formula (DS2) below. Also listed together with the construction data are the aspherical surface data of each aspherical surface, the diffractive optical surface data of each diffractive optical surface, and other data.

$$X(H) = (C \cdot H^2)/(1+\sqrt{1-C^2 \cdot H^2}) + (A4 \cdot H^4 + A6 \cdot H^6 + A8 \cdot H^8 + A10 \cdot H^{10}) \quad \text{(AS)}$$

where

X(H) represents the displacement along the optical axis at the height H (relative to the vertex);

H represents the height in a direction perpendicular to the optical axis;

C represents the paraxial curvature; and

Ai represents the aspherical coefficient of the ith order.

$$\phi(H) = (2\pi/\lambda 0) \cdot (C1 \cdot H^2 + C2 \cdot H^4) \quad \text{(DS1)}$$

where

φ(H) represents the phase function;

H represents the height in a direction perpendicular to the optical axis;

Ci represents the phase function coefficient of the 2ith order; and

λ0 represents the design wavelength.

$$\epsilon(H) = d \times (\epsilon 1 \cdot H^2 + \epsilon 2 \cdot H^4 + \epsilon 3 \cdot H^6 + \epsilon 4 \cdot H^8) \quad \text{(DS2)}$$

where

ε(H) represents the position of the vertex of the triangle as measured in the direction of the grating pitch;

d represents the grating pitch (in μm; corresponding to φ(H));

ε1 represents the coefficient of the 2ith order for calculating ε; and

H represents the height in a direction perpendicular to the optical axis.

Next, with reference to the drawings, a diffractive optical element embodying the invention will be described that offers high diffraction efficiency over a wide wavelength range and that is nevertheless fit for mass production. As described earlier, according to U.S. Pat. No. 5,847,877 and the report by Steven M. Ebstein (the Sep. 15, 1996 issue of Optical Society of America), a diffractive optical element is designed to have a relief pattern constituting a diffraction grating formed at the cementing interface between two different optical materials. In this diffractive optical element, by exploiting the fact that the difference in refractive index between two optical materials depends on the wavelength, the wavelength-dependent variation in phase difference is successfully prevented, and thereby higher diffraction efficiency is achieved over a wide wavelength range. However, to realize such a diffractive optical element, various requirements need to be satisfied as noted below.

First, to make mass production possible, a first material is shaped by the use of a die having a relief pattern formed on it, and a second material is shaped by the use of the thus shaped first material (in-mold shaping). To achieve this, it is essential that the two materials have greatly different melting points (or transition points, for glass) from each other.

Second, to obtain sufficient durability in the die having the relief pattern formed thereon, the melting points (or transition points, for glass) of the materials should not exceed 600° C.

Third, for reasons related to the manufacture of the mold, the grating height of the relief pattern cannot be made higher than a certain limit. More precisely, it is preferable that the grating height be 20 μm or below. This inevitably requires that the difference in refractive index between the two optical materials be 0.03 or more.

Fourth, to obtain sufficiently high diffraction efficiency, the diffractive optical element needs to be composed of an optical material that has relatively high refractive index and relatively low dispersion and an optical material that has relatively low refractive index and relatively high dispersion.

In a case where both of the two materials are resin, by employing an ultraviolet-ray-setting resin or the like as one of them, it is possible to satisfy the first and second requirements, but the third and fourth requirements remain unfulfilled. On the other hand, in a case where both of the two materials are glass, it is possible to satisfy the third and fourth requirements, but, even if low-melting-point glass is used as one of the two materials, the transition point of the other exceeds 600° C. Consequently, the second requirement remains unfulfilled.

The conventional examples described earlier include examples that use a combination of glass and resin as two materials. According to the report by Steven M. Ebstein (Sep. 15, 1996 issue of Optical Society of America), a diffractive optical element employs a combination of dense crown glass (SSK3; with a refractive index nd=1.614 for the d line, an Abbe number vd=51.3, and a transition point Tg=615° C.) as a glass material and polystyrene (nd=1.585, vd=30.6) as a resin material. According to U.S. Pat. No. 5,847,877, a diffractive optical element employs a combination of lanthanum crown glass (BSM81; nd=1.64, vd=60, and Tg=670° C.) as a glass material and polycarbonate (nd=1.583, vd=30.2) as a resin material. In either diffractive optical element, the glass material does not satisfy the second requirement.

Figure 7:
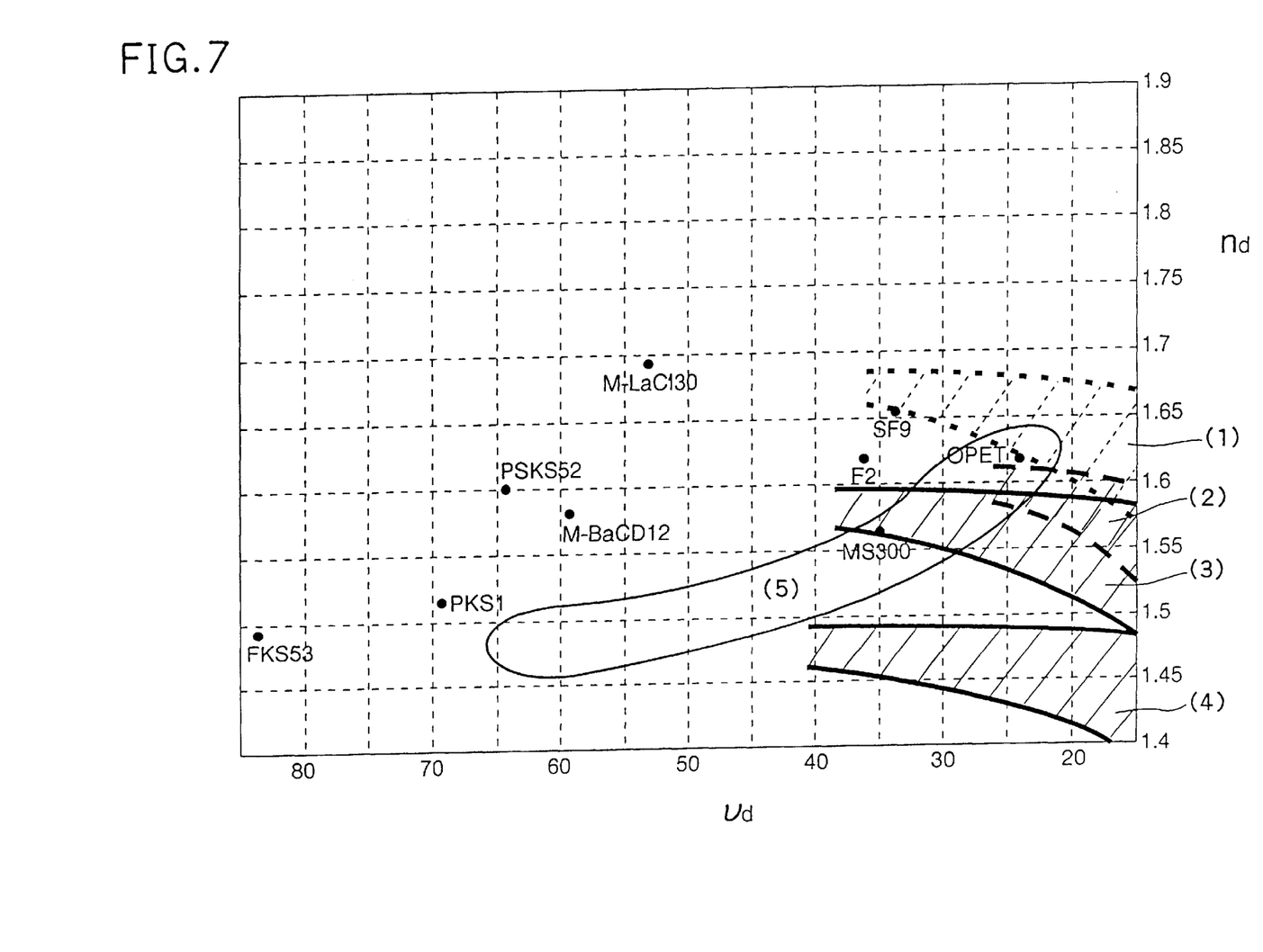
FIG. 7 is a chart showing the distribution of optical materials that can be used to make a diffractive optical element, as plotted in terms of the refractive index for the d line and the Abbe number.

Now, a diffractive optical element embodying the invention will be described that is fit for mass production. FIG. 7 is a chart showing the distribution of various optical materials in terms of the refractive index nd for the d line (taken along the vertical axis) and the Abbe number vd (taken along the horizontal axis). In FIG. 7, the seven types of glass (FKS53, PKS1, PSKS52, M-BaCD12, M-LaC130, F2, and SF9) all have a transition point Tg of 600° C. or below, and the two types of resin (MS300 and OPET) are both typical optical resin that has an Abbe number vd of 60 or below.

The hatched areas (1) to (4) in FIG. 7 indicate the ranges of properties in which high diffraction efficiency is obtained for red light R, green light G, and blue light B by combination with a specific type of glass element. More precisely, (1) indicates the range of glass types that offer high diffraction efficiency for R, G, and B when combined with M-LaC130; (2) indicates the range of glass types that offer high diffraction efficiency for R, G, and B when combined with F2; (3) indicates the range of glass types that offer high diffraction efficiency for R, G, and B when combined with PSKS52; and (4) indicates the range of glass types that offer high diffraction efficiency for R, G, and B when combined with FKS53. In addition, the encircled area (5) indicates the range of glass types that offer properties corresponding to the properties of optical resin. Thus, it can be said that OPET and MS300 are preferable types of optical resin here, because they lie in the overlapping area.

As will be understood from FIG. 7, low-dispersion types of glass that satisfy the second requirement noted above include dense phosphate crown glass (such as PSKS52; nd=1.6, vd=64.38, and Tg=534° C.), recently developed a low-melting-point dense crown glass (such as M-BaCD12; nd=1.58313, vd=59.5, and Tg=500° C.), phosphate crown glass (such as PKS1; nd=1.517, vd=69.43, and Tg=522° C.), and fluorosilicate crown glass (such as FKS52; nd=1.493, vd=83.58, and Tg=480° C.). In other words, it is preferable that the optical material abutting the relief pattern from one side be glass that fulfills Conditions (A1), (B1), and (C1) below. If these conditions are not satisfied, the transition point Tg of the glass exceeds 600° C. This makes it impossible to obtain sufficient durability in the mold.

$$nd \leq 1.62 \quad (A1)$$

$$55 \leq vd \quad (B1)$$

$$Tg < 600 \quad (C1)$$

where vd represents the Abbe number $(=(nd-1)/(nF-nC))$;

nd represents the refractive index of the optical material, for the d line;

nF represents the refractive index of the optical material, for the F line;

nC represents the refractive index of the optical material, for the C line; and

Tg represents the transition point of the glass (° C.).

Furthermore, in order for the fourth requirement noted above to be satisfied, it is preferable that the optical material abutting the relief pattern from the other side be resin that fulfills Conditions (A2) and (B2) below. If these conditions are not satisfied, it is impossible to obtain satisfactorily high diffraction efficiency over a wide wavelength range.

$$nd \leq 1.6 \quad (A2)$$

$$30 \leq vd \leq 60 \quad (B2)$$

High-dispersion types of glass that satisfy the second requirement noted above include dense flint glass (such as SF9; nd=1.654, vd=33.86, and Tg=430° C.) and lint glass (such as F2; nd=1.62, vd=36.32, and Tg=430° C.). In other words, it is preferable that the optical material abutting the relief pattern from one side be glass that fulfills Conditions (A3), (B3) below, and (C1) above. If these conditions are not satisfied, the transition point Tg of the glass exceeds 600° C. This makes it impossible to obtain sufficient durability in the mold.

$$1.6 \leq nd \quad (A3)$$

$$vd \leq 40 \quad (B3)$$

Furthermore, in order for the fourth requirement noted above to be satisfied, it is preferable that the optical material abutting the relief pattern from the other side be resin that fulfills Conditions (A4) and (B4) below. If these conditions are not satisfied, it is impossible to obtain sufficiently high diffraction efficiency over a wide wavelength range.

$$nd \leq 1.65 \quad (A4)$$

$$vd \leq 30 \quad (B4)$$

Recently-developed low-melting-point lanthanum crown glass (such as M-LaC130; nd=1.69350, vd=53.2, and Tg=520° C.) is one of the types of glass that, having a high refractive index and a medium dispersion, satisfy the second requirement noted above. In other words, it is preferable that the optical material abutting the relief pattern from one side be glass that fulfills Conditions (A5), (B5) below, and (C1) above. If these conditions are not satisfied, the transition point Tg of the glass exceeds 600° C. This makes it impossible to obtain sufficient durability in the mold.

$$1.65 \leq nd \quad (A5)$$

$$40 \leq vd \leq 55 \quad (B5)$$

Furthermore, in order for the fourth requirement noted above to be satisfied, it is preferable that the optical material abutting the relief pattern from the other side be resin that fulfills Conditions (A4) and (B4) above. If these conditions are not satisfied, it is impossible to obtain sufficiently high diffraction efficiency over a wide wavelength range.

EXAMPLES

Hereinafter, three practical examples of the above-described highly mass-producible diffractive optical element will be described in detail. In all of Examples 1 to 3 described below, the diffractive optical element is composed of two layers of different optical materials (glass and resin) and has a relief pattern constituting a diffraction grating formed at the cementing interface between the two optical materials, with the relief pattern so shaped that the diffraction grating has a blaze-formed sectional profile. The diffraction efficiency η of the diffractive optical element is calculated in accordance with Formula (D) below.

$$\eta = [\{\sin(\pi(\alpha - m))\}/\{\pi(\alpha - m)\}]^2 \quad (D)$$

$$\alpha = h0 \cdot (n - n')/\lambda$$

where m represents the diffraction order;

h0 represents the grating height of the relief pattern;

n represents the refractive index of glass; and n' represents the refractive index of resin.

Example 1

The diffractive optical element of Example 1 is realized by combining glass PSKS52 (with nd=1.6, vd=64.33, and Tg=534° C.) and resin MS300 (with nd=1.5644 and vd=35.1). The relief pattern formed at the interface between the glass and resin is designed to offer a grating height of h0=16.6 μm, with the design wavelength set at θ=435 nm. Table 12 lists the diffraction efficiency η of the diffractive optical element of Example 1.

Example 2

The diffractive optical element of Example 2 is realized by combining glass SF9 (with nd=1.65446, vd=33.86, and Tg=435° C.) and resin OPET (with nd=1.62017 and vd=24.01). The relief pattern formed at the interface between the glass and resin is designed to offer a grating height of h0=17.2 μm, with the design wavelength set at λ=435 nm. Table 13 lists the diffraction efficiency η of the diffractive optical element of Example 2.

Example 3

The diffractive optical element of Example 3 is realized by combining glass M-LaC130 (with nd=1.69350, vd=53.2, and Tg=520° C.) and resin OPET (with nd=1.62017 and vd=24.01). The relief pattern formed at the interface between the glass and resin is designed to offer a grating height of h0=7.9 μm, with the design wavelength set at λ0=435 nm. Table 14 lists the diffraction efficiency η of the diffractive optical element of Example 3.

TABLE 1

<<Diffraction Efficiency η (%) for Case where θ = 0°>>

| Light Rays | λ (nm) | Blaze-Formed | | | Triangular (ε/d = 0.1) | | | Trapezoid (δ/d = 0.1) | | |
|---|---|---|---|---|---|---|---|---|---|---|
| | | m = 0 | m = 1 | m = 2 | m = 0 | m = 1 | m = 2 | m = 0 | m = 1 | m = 2 |
| g | 435.84 | 0.00 | 100.00 | 0.01 | 1.15 | 80.98 | 0.63 | 0.09 | 98.78 | 0.11 |
| F | 486.13 | 0.20 | 99.41 | 0.10 | 0.38 | 81.27 | 1.38 | 0.21 | 99.00 | 0.17 |
| e | 546.07 | 0.10 | 99.75 | 0.02 | 0.58 | 81.27 | 1.05 | 0.13 | 99.07 | 0.11 |
| d | 587.56 | 0.00 | 100.00 | 0.02 | 1.11 | 80.99 | 0.58 | 0.09 | 98.79 | 0.11 |
| C | 656.28 | 0.33 | 98.84 | 0.48 | 2.84 | 79.23 | 0.07 | 0.64 | 96.50 | 0.50 |

TABLE 2

<<Diffraction Efficiency η (%) for Case where θ = 20°>>

| Light Rays | λ (nm) | Blaze-Formed | | | Triangular (ε/d = 0.1) | | | Trapezoid (δ/d = 0.1) | | |
|---|---|---|---|---|---|---|---|---|---|---|
| | | m = 0 | m = 1 | m = 2 | m = 0 | m = 1 | m = 2 | m = 0 | m = 1 | m = 2 |
| g | 435.84 | 0.37 | 90.66 | 4.71 | 0.18 | 71.82 | 1.89 | 0.38 | 86.19 | 3.15 |
| F | 486.13 | 0.98 | 94.99 | 4.55 | 0.00 | 75.53 | 1.63 | 1.02 | 91.38 | 3.21 |
| e | 546.07 | 0.75 | 93.70 | 4.63 | 0.02 | 74.40 | 1.74 | 0.78 | 89.80 | 3.21 |
| d | 587.56 | 0.39 | 90.83 | 4.71 | 0.17 | 71.96 | 1.90 | 0.40 | 86.38 | 3.15 |
| C | 656.28 | 0.00 | 83.45 | 4.60 | 1.08 | 65.94 | 2.10 | 0.09 | 77.95 | 2.81 |

TABLE 3

<<λ/|n − n'|>>

| | g line λ = 435.84(nm) | F line λ = 486.13(nm) | C line λ = 656.28(nm) |
|---|---|---|---|
| SF9 + OPET | 17.2(μm) | 16.5(μm) | 18.2(μm) |
| PSKS52 + MS300 | 16.6(μm) | 15.8(μm) | 17.5(μm) |

TABLE 4

| Glass | PSKS52: nd = 1.6 | vd = 64.33 | Tg = 534(° C.) |
|---|---|---|---|
| Resin | MS300: nd = 1.5644 | vd = 35.1 | — |
| Glass | SF9: nd = 1.65446 | vd = 33.86 | Tg = 435(° C.) |
| Resin | OPET: nd = 1.62017 | vd = 24.01 | — |

TABLE 5

<<Diffraction Efficiency η (%) For Axial Rays>>

| Light Rays | λ (nm) | From the object side: Glass Relief pattern, and Resin | | | From the object side: Resin Relief pattern, and Glass | | |
|---|---|---|---|---|---|---|---|
| | | m = 0 | m = 1 | m = 2 | m = 0 | m = 1 | m = 2 |
| g | 435.84 | 0.00 | 99.99 | 0.03 | 0.00 | 100.00 | 0.01 |
| F | 486.13 | 0.20 | 99.17 | 0.43 | 0.20 | 99.41 | 0.10 |
| e | 546.07 | 0.10 | 99.56 | 0.27 | 0.10 | 99.75 | 0.02 |
| d | 587.56 | 0.00 | 99.97 | 0.06 | 0.00 | 100.00 | 0.02 |
| C | 656.28 | 0.33 | 99.22 | 0.10 | 0.33 | 98.84 | 0.48 |

TABLE 6

<<Diffraction Efficiency η (%) For Off-Axial Rays>>
[Relief Pattern placed in front of Pupil, Diffraction Grating having Positive Power]

| Light Rays | λ (nm) | From the object side: Glass Relief pattern, and Resin | | | From the object side: Resin Relief pattern, and Glass | | |
|---|---|---|---|---|---|---|---|
| | | m = 0 | m = 1 | m = 2 | m = 0 | m = 1 | m = 2 |
| g | 435.84 | 0.01 | 97.72 | 3.62 | 0.01 | 98.57 | 1.53 |
| F | 486.13 | 0.25 | 94.64 | 6.32 | 0.25 | 99.84 | 0.87 |
| e | 546.07 | 0.13 | 95.69 | 5.58 | 0.13 | 99.54 | 1.12 |
| d | 587.56 | 0.01 | 97.49 | 4.08 | 0.01 | 98.58 | 1.60 |
| C | 656.28 | 0.26 | 99.70 | 1.76 | 0.26 | 94.95 | 2.64 |

TABLE 7

| Arrangement | Angle of Incidence (°) | n | θ (°) | n' | θ' (°) | Angle of Emergence (°) | α | η (%) |
|---|---|---|---|---|---|---|---|---|
| Glass, Resin | −10 | 1.60648 | −6.21 | 1.57578 | −7.73 | −12.23 | 1.213 | 6.32 |
| Resin, Glass | −10 | 1.57578 | −6.33 | 1.60648 | −7.58 | −12.23 | 0.895 | 0.87 |

TABLE 8

<<Diffraction Efficiency η (%) For Off-Axial Rays>>
[Relief Pattern placed in front of Pupil,
Diffraction Grating having Negative Power]

| Light | | From the object side: Glass, Relief pattern, and Resin | | | From the object side: Resin, Relief pattern, and Glass | |
|---|---|---|---|---|---|---|
| Rays | λ (nm) | m = 0 | m = 1 | m = 2 | m = 0 | m = 1 | m = 2 |
| g | 435.84 | 0.01 | 98.82 | 1.11 | 0.01 | 98.15 | 2.31 |
| F | 486.13 | 0.25 | 99.92 | 0.49 | 0.25 | 95.38 | 4.26 |
| e | 546.07 | 0.13 | 99.71 | 0.65 | 0.13 | 96.44 | 3.45 |
| d | 587.56 | 0.01 | 98.90 | 1.03 | 0.01 | 98.09 | 2.23 |
| C | 656.28 | 0.26 | 95.65 | 1.96 | 0.26 | 99.90 | 0.61 |

TABLE 9

<<Diffraction Efficiency η (%) For Off-Axial Rays>>
[Relief Pattern placed in back of Pupil,
Diffraction Grating having Positive Power]

| Light | | From the object side: Glass, Relief pattern, and Resin | | | From the object side: Resin, Relief pattern, and Glass | | |
|---|---|---|---|---|---|---|---|
| Rays | λ (nm) | m = 0 | m = 1 | m = 2 | m = 0 | m = 1 | m = 2 |
| g | 435.84 | 0.01 | 98.82 | 1.11 | 0.01 | 98.15 | 2.31 |
| F | 486.13 | 0.25 | 99.92 | 0.49 | 0.25 | 95.38 | 4.26 |
| e | 546.07 | 0.13 | 99.71 | 0.65 | 0.13 | 96.44 | 3.45 |
| d | 587.56 | 0.01 | 98.90 | 1.03 | 0.01 | 98.09 | 2.23 |
| C | 656.28 | 0.26 | 95.65 | 1.96 | 0.26 | 99.90 | 0.61 |

TABLE 10

<<Diffraction Efficiency η (%) For Off-Axial Rays>>
[Relief Pattern placed in back of Pupil,
Diffraction Grating having Negative Power]

| Light | | From the object side: Glass, Relief pattern, and Resin | | | From the object side: Resin, Relief pattern, and Glass | | |
|---|---|---|---|---|---|---|---|
| Rays | λ (nm) | m = 0 | m = 1 | m = 2 | m = 0 | m = 1 | m = 2 |
| g | 435.84 | 0.01 | 97.72 | 3.62 | 0.01 | 98.57 | 1.53 |
| F | 486.13 | 0.25 | 94.64 | 6.32 | 0.25 | 99.84 | 0.87 |
| e | 546.07 | 0.13 | 95.69 | 5.58 | 0.13 | 99.54 | 1.12 |
| d | 587.56 | 0.01 | 97.49 | 4.08 | 0.01 | 98.58 | 1.60 |
| C | 656.28 | 0.26 | 99.70 | 1.76 | 0.26 | 94.95 | 2.64 |

TABLE 11

<<Construction Data of Embodiment>>

$f = 3.34 \sim 9.65$ (mm)
$\omega = 29.1 \sim 10.9$ (°)
$FNO = 3 \sim 5.3$

| Radius of Curvature | Axial Distance | Refractive Index | Abbe Number |
|---|---|---|---|
| r1* = 13.55 | | | |
| | d1 = 1.09 | N1 = 1.7725 | ν1 = 49.77 |
| r2* = 4.17 | | | |
| | d2 = 1.11 | | |
| r3* = 6.82 | | | |
| | d3 = 2.19 | N2 = 1.65446 | ν2 = 33.86 |
| r4*# = 2.30 | | | |
| | d4 = 0.65 | N3 = 1.62017 | ν3 = 24.01 |
| r5* = 4.67 | | | |
| | d5 = 6.11~0.4 | | |
| r6 = ∞{Aperture Stop (S)} | | | |
| | d6 = 0.00 | | |
| r7* = 43.18 | | | |
| | d7 = 3.26 | N4 = 1.6 | ν4 = 64.38 |
| r8*# = −2.02 | | | |
| | d8 = 0.41 | N5 = 1.5644 | ν5 = 35.1 |
| r9* = −3.70 | | | |
| | d9 = 0.61~7.22 | | |
| r10 = ∞ | | | |
| | d10 = 3.60 | N6 = 1.5168 | ν6 = 64.12 |
| r11 = ∞ | | | |
| | d11 = 5.88 | | |
| r12 = ∞{Image Plane(IM)} | | | |

[Aspherical Surface Data of First Surface (r1)]
A4 = 0.009071
A6 = −0.0001235
A8 = −4.4 × $10^{-6}$
[Aspherical Surface Data of Second Surface (r2)]
A4 = 0.012871
A6 = 0.00211106
A8 = 9.85 × $10^{-5}$
[Aspherical Surface Data of Third Surface (r3)]
A4 = −0.00584
A6 = 0.00141341
A8 = −0.00014
[Aspherical Surface Data of Fourth Surface (r4)]
A4 = 0.036276
A6 = −0.015181
A8 = 0.002011
[Aspherical Surface Data of Fifth Surface (r5)]
A4 = −0.01326
A6 = 0.0018055
A8 = −0.00037
[Aspherical Surface Data of Seventh Surface (r7)]
A4 = −0.00695
A6 = −0.0008778
A8 = 0.000301
A10 = −0.00013
[Aspherical Surface Data of Eighth Surface (r8)]
A4 = −0.01369
A6 = 0.0051316
A8 = −0.00021
[Aspherical Surface Data of Ninth Surface (r9)]
A4 = 0.000919
A6 = −0.0003216
A8 = 3.39 × $10^{-5}$
[Diffractive Optical Surface Data of Fourth Surface (r4)]
C1 = 0.003039
C2 = −0.0007736

TABLE 11-continued

<<Construction Data of Embodiment>>
$\epsilon1 = -0.46796$
$\epsilon2 = 0.864644$
$\epsilon3 = -0.4856$
$\epsilon4 = 0.088904$
[Diffractive Optical Surface Data of Eighth Surface (r8)]
$C1 = -0.00146$
$C2 = 0.00030703$
$\epsilon1 = 0.012094$
$\epsilon2 = -0.09551$
$\epsilon3 = 0.130182$
$\epsilon4 = -0.03677$

TABLE 12

[Diffraction Efficiency η (%) in Example 1]

| Light Rays | λ (nm) | m = 0 | m = 1 | m = 2 |
|---|---|---|---|---|
| g line | 435.84 | 0.00 | 99.99 | 0.03 |
| e line | 546.07 | 0.10 | 99.56 | 0.27 |
| C line | 656.28 | 0.33 | 99.22 | 0.10 |

TABLE 13

[Diffraction Efficiency η (%) in Example 2]

| Light Rays | λ (nm) | m = 0 | m = 1 | m = 2 |
|---|---|---|---|---|
| g line | 435.84 | 0.00 | 99.99 | 0.03 |
| e line | 546.07 | 0.10 | 99.56 | 0.27 |
| C line | 656.28 | 0.33 | 99.22 | 0.10 |

TABLE 14

[Diffraction Efficiency η (%) in Example 3]

| Light Rays | λ (nm) | m = 0 | m = 1 | m = 2 |
|---|---|---|---|---|
| g line | 435.84 | 0.00 | 99.99 | 0.01 |
| e line | 546.07 | 0.01 | 99.93 | 0.04 |
| C line | 656.28 | 0.75 | 98.01 | 0.43 |

What is claimed is:

1. A diffractive optical element for white light, comprising a plurality of layers of optical materials and having a relief pattern constituting a diffraction grating that has a first sectional profile in a central region that is different from a second sectional profile in a peripheral region, said diffraction grating formed at one or more cementing interfaces, each cementing interface being between a respective pair of layers of said plurality of layers, the optical materials of a respective pair of layers differing from each other, wherein a grating height of the relief pattern constituting the diffraction grating is defined by the following formula:

$$h = \lambda/|n-n'|$$

where h represents the grating height of the relief pattern constituting the diffraction grating;

λ represents a selected design wavelength;

n represents a refractive index of an optical material abutting a first one of the one or more interfaces from an object side for light of a wavelength λ; and n' represents a refractive index of an optical material abutting the first one of the one or more interfaces from an image side for light of the wavelength λ, wherein the first sectional profile is a blaze-form sectional profile and the second sectional profile is a triangular sectional profile.

2. A diffractive optical element for white light, comprising a plurality of layers of optical materials and having a relief pattern constituting a diffraction grating that has a first sectional profile in a central region that is different from a second sectional profile in a peripheral region, said diffraction grating formed at one or more cementing interfaces, each cementing interface being between a respective pair of layers of said plurality of layers, the optical materials of a respective pair of layers differing from each other, wherein a grating height of the relief pattern constituting the diffraction grating is defined by the following formula:

$$h = \lambda/|n-n'|$$

where h represents the grating height of the relief pattern constituting the diffraction grating;

λ represents a selected design wavelength;

n represents a refractive index of an optical material abutting a first one of the one or more interfaces from an object side for light of a wavelength λ; and n' represents a refractive index of an optical material abutting the first one of the one or more interfaces from an image side for light of the wavelength λ, wherein the first sectional profile is a trapezoidal sectional profile and the second sectional profile is a triangular sectional profile.

* * * * *